United States Patent
Sauler et al.

(10) Patent No.: US 6,814,048 B2
(45) Date of Patent: Nov. 9, 2004

(54) METHOD AND DEVICES FOR AVOIDING KNOCKING ON FAILURE OF AN ANTI-KNOCK REGULATOR

(75) Inventors: Jürgen Sauler, Stuttgart (DE); Oskar Torno, Schwieberdingen (DE); Axel Heinstein, Wimsheim (DE); Carsten Kluth, Stuttgart (DE); Werner Haeming, Neudenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/343,545

(22) PCT Filed: Apr. 21, 2001

(86) PCT No.: PCT/DE01/01528

§ 371 (c)(1),
(2), (4) Date: Aug. 25, 2003

(87) PCT Pub. No.: WO02/10586

PCT Pub. Date: Feb. 7, 2002

(65) Prior Publication Data

US 2004/0020462 A1 Feb. 5, 2004

(30) Foreign Application Priority Data

Jul. 29, 2000 (DE) .......................... 100 37 024

(51) Int. Cl.$^7$ .................................................. F02B 3/00
(52) U.S. Cl. .................... 123/299; 123/294; 123/406.16
(58) Field of Search .................................. 123/294, 299, 123/406.16, 406.12, 406.29, 406.39

(56) References Cited

U.S. PATENT DOCUMENTS

| | | | |
|---|---|---|---|
| 4,521,769 A | 6/1985 | Dudeck et al. | |
| 4,700,677 A | 10/1987 | Bonitz et al. | |
| 5,215,059 A | 6/1993 | Kaneyasu | |
| 5,713,328 A | 2/1998 | Anderson et al. | |
| 6,109,242 A | * 8/2000 | Katashiba et al. | .......... 123/435 |

FOREIGN PATENT DOCUMENTS

| | | |
|---|---|---|
| JP | 56 066 426 | 6/1981 |
| JP | 63 085 238 | 4/1988 |

* cited by examiner

Primary Examiner—Bibhu Mohanty
(74) Attorney, Agent, or Firm—Kenyon & Kenyon

(57) ABSTRACT

A device having a monitoring circuit for a knock control and a control circuit which initiates substitute measures in the event of a fault in the knock control, depending on the output signal of the monitoring circuit, is described. The control unit is designed, for example, so that the number of fuel injection operations per operating cycle of a cylinder of the engine is increased as the substitute measure.

12 Claims, 2 Drawing Sheets

METHOD AND DEVICES FOR AVOIDING KNOCKING ON FAILURE OF AN ANTI-KNOCK REGULATOR

FIELD Of THE INVENTION

The present invention relates to a method in which a firing angle and/or an ignition time of a gasoline or diesel engine having direct injection is regulated with the help of a knock control for preventing knocking during engine operation. In fault-free operation of a knock control, fuel is injected once per operating cycle into the combustion chamber of a cylinder of the engine. In addition, combustion is monitored by the knock control.

BACKGROUND INFORMATION

A known measure in the event of failure of knock control of gasoline engines is a safety retardation of the firing angle relative to the crankshaft position, the cylinder standing at 0° (crank angle) at top dead center, TDC. The firing angle is typically retarded by 12° to 15° (crank angle). At such a firing angle, engine knocking does not occur. However, one disadvantage of this is the loss of engine sufficient due to the safety retardation.

The problem on which the present invention is based is to provide a simple method of preventing knocking in the event of failure of a knock control, so that it will also permit operation of the engine at a high efficiency even in the event of failure of the knock control. In addition, a device is also to be provided for this method.

It is already known from Japanese Patent Application No. 56 066,426 to increase the quantity of fuel injected as a knock-reducing measure when a knock sensor fails.

SUMMARY OF THE INVENTION

The relationships in direct fuel injection are utilized for the present invention. Due to the design of the injection system, fuel is atomized in an especially fine spray. Different rotational movements of air layers are achieved due to the air flow created in the intake and compression strokes. There are different mixing ratios in the combustion chamber due to the injection of fuel in the intake stroke as well as the compression stroke. Around the spark plug there is a rich fuel-air mixture surrounded by lean layers at the edge of the combustion chamber. Lean layers, i.e., layers in which the mixing ratio of fuel to air in kg is less than 1:14.8, are not as flammable as layers in which the fuel mixture is rich. A fundamental cause of knocking is spontaneous ignition in boundary areas occurring in addition to the main ignition.

The present invention is based on the finding that whereas the knocking tendency of direct injection engines is already reduced, it may be further decreased by multiple injection and/or a different injection quantity during a operating cycle of the engine. For example, in the case of a gasoline engine, there is a single injection during the intake stroke and the compression stroke or the injection quantity is increased. This measure yields a very large gradient of the mixing ratio from the spark plug area to the edge of the combustion chamber. This gradient counteracts engine knocking. Since knocking is already limited in this way, it is no longer necessary to make a safety retardation or at any rate a smaller angle may be used for the safety retardation. A considerable loss of engine efficiency may be prevented by the method according to the present invention, because the firing angle need not be retarded by the usual large crank angle values of 12° to 15°.

In a refinement of the method according to the present invention, the firing angle is controlled as a function of the engine rotational speed and/or engine load after the change in injection quantity. The engine rotational speed and engine load are the essential characteristic variables which influence the firing angle. However other characteristic variables may also be taken into account to improve the control.

The present invention also relates to a device for preventing knocking in the event of failure of a knock control. This device makes it possible to implement the method steps of the method according to the present invention and it includes a monitoring circuit for a knock control and a control unit which initiate substitute measures to prevent knocking in the event of a fault in the knock control, depending on the output signal of the monitoring circuit. The control unit is designed so that the substitute measure in the case of a gasoline engine involves, for example, a transition from a single injection of fuel per operating cycle of a cylinder of the engine to two injections of fuel per operating cycle. The technical effects and considerations described above for the method according to the present invention also apply to the device according to the present invention.

In a next refinement, the control unit controls the firing angle as a function of the engine rotational speed and/or engine load. Thus the essential characteristic variables which are crucial for the adjustment of the firing angle are also taken into account with appropriate measure. Although regulation in a closed-loop control circuit is no longer possible, control is performed nevertheless to be able to adjust an acceptable firing angle.

DETAILED DESCRIPTION

Figure 1:
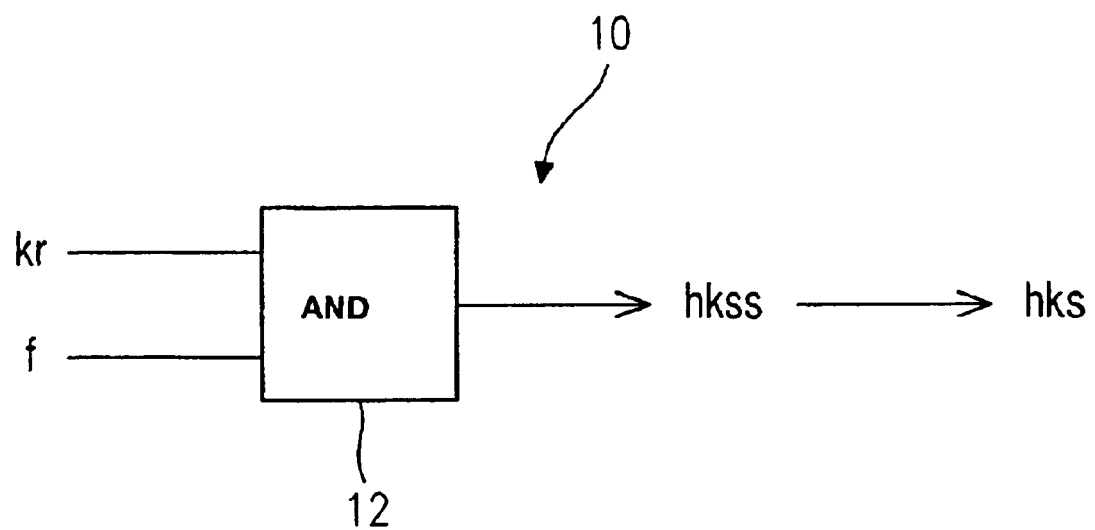
FIG. 1 shows a block diagram of part of a control circuit for activating multiple injection in the event of failure of a knock control.

FIG. 1 shows a block diagram of part of a control circuit 10 for activating multiple injection in the event of failure of a knock control of a direct injection gasoline engine (not shown). Control circuit 10 contains an AND logic element 12 at whose one input an activation signal kr is applied and at whose other input a fault signal f is applied. Activation signal kr and fault signal f are generated by a controller of the firing system. Activation signal kr has the switch state logic ONE when the knock control is to be active. Fault signal f has the switch state logic ONE when there is a disturbance in the knock control. AND logic element 12 gates the values of the activation signal and the fault signal according to the logic AND function and outputs a request signal hkss whose signal value of logic ONE causes switching over from single injection to double injection. The letter sequence hkss denotes homogeneous anti-knock safety setpoint.

The method steps and components required for switching over the type of injection are not the object of the present invention and therefore will not be explained in greater detail. For example, the position of the throttle valve may be altered in switching over. In addition, the injection nozzles are actuated according to another scheme.

If the switching over is performed successfully, the signal value of a control signal hks (homogeneous anti-knock safety protection) is switched to logic ONE. However, if the switching over cannot be performed, the signal value of control signal hks remains at the value of logic ZERO. For example, this is the case when the fault causing the failure of the knock control also prevents the system from switching over to double injection.

Figure 2:
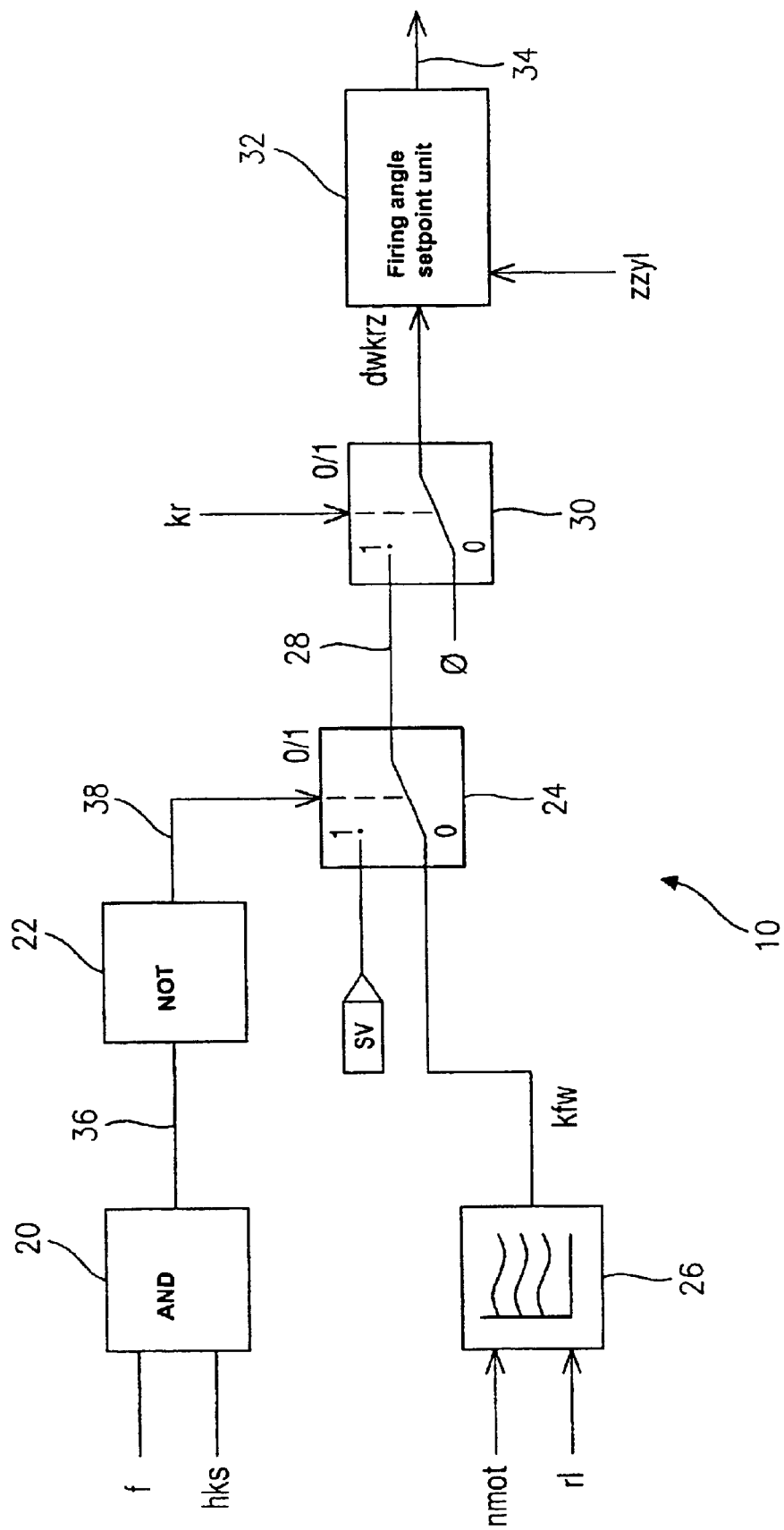
FIG. 2 shows a block diagram of another part of the control circuit.

FIG. 2 shows the other part of control circuit 10. Control circuit 10 contains another AND logic element 20 at whose one input is applied fault signal f and control signal hks at its other input. AND logic element 20 gates the signal values applied to its inputs according to the logic AND function. The output of AND logic element 20 is connected to the input of a NOT element 22 which outputs at its output a signal value inverted relative to the signal value applied at its input. The output of NOT element 22 is connected to the switching over input of a switching unit 24. Depending on the signal at the switching input, switching unit 24 switches between two switch states 0 and 1.

Control circuit 10 also contains an engine characteristics map unit 26 in which are stored various ignition characteristics maps for the double injection mode of operation. Engine characteristics map unit 26 has a plurality of inputs, of which FIG. 2 shows inputs for inputting an rotational speed signal nmot and a load signal rl (relative air filling). Engine characteristics map unit 26 reads a value for the firing angle out of a memory unit (not shown), depending on the signal values of the rotational speed signal nmot and load signal rl, and outputs an engine characteristics map value kfw. Engine characteristics map unit 26 may be either an analog or digital unit. Then rotational speed signal nmot, load signal rl, and engine characteristics map value kfw are either analog or digital signals accordingly.

Engine characteristics map value kfw is applied to the one input of switching unit 24 and is output at the output of switching unit 24 in switch state 0 of switching unit 24 (see output signal 28). The other input of switching unit 24 is connected to output signal sv of a knock control unit (not shown) for retardation, adjusting the firing angle in a regulating operation. Output signal sv goes to the output of switching unit 24 in switch state 1 of switching unit 24.

Control circuit 10 contains another switching unit 30 at whose switching input activation signal kr is applied. Depending on the signal value of activation signal kr, switching unit 30 operates in two switch states 0 and 1. Signal value of logic ZERO is constantly applied at the one input of switching unit 30. If control signal kr has the value logic ZERO, then in switch state 0 of switching unit 30, value ZERO applied at the input is output at the output of the switching unit and is used as input signal dwkrz for a firing angle setpoint unit 32.

The other input of switching unit 30 is connected to the output of switching unit 24, so that in switch state 1 of switching unit 30, output signal 28 stipulates the course of input signal dwkrz.

Firing angle setpoint unit 32 also has an input for a cylinder counting signal zzyl whose signal value indicates the cylinder in whose combustion chamber an ignition is to be executed. Firing angle setpoint unit 32 outputs a firing angle signal 34 which specifies the firing angle for all cylinders of the engine in succession.

The part of control circuit 10 shown in FIG. 2 operates as follows with fully functional knock control. Fault signal f and control signal hks have the signal value of logic ZERO. A logic signal 36 at the output of AND logic element 20 therefore also has the signal value of logic ZERO. A switching signal 38 at the output of NOT element 22 has the signal value of logic ONE because of the inversion of logic signal 36, so that switching unit 24 is switched to switch state 1. Output signal sv output by anti-knock regulating unit stipulates the course of output signal 28. If activation signal kr has a value of logic ZERO, no knocking is detected and no knock control is necessary. In this case switching unit 30 has switch state 0 so that input signal dwkrz has the value of logic ZERO. Firing angle setpoint unit 32 outputs a firing angle signal 34, which is not corrected with regard to knock control.

However, if activation signal kr has the value of logic ONE in the case of fully functional knock control because knocking is detected, then switching unit 30 operates in switch state 1. In switch state 1, output signal 28 of switching unit 24 stipulates the course of input signal dwkrz. Firing angle setpoint unit 32 therefore outputs a firing angle signal 34 which is corrected with the help of the firing angle specified by the knock control to counteract engine knocking.

If there is a disturbance in the function of the knock control, then fault signal f first has a value of logic ONE and control signal hks has a value of logic ZERO. Logic signal 36 therefore continues to have a value of logic ZERO. The operation of control unit 10 corresponds to the operation described above. However, if the signal value of control signal hks is switched to the value ONE on the basis of the processes illustrated above in FIG. 1, then the value of logic signal 36 changes to the value of logic ONE. Control signal hks has the value of logic ONE as soon as the system switches to double injection. The signal change in logic signal 36 results in a change in the signal value of switching signal 38. Switching signal 38 then has the value of logic ZERO so that switching unit 24 is switched to switch state 0. Engine characteristics map value kfw which depends on the current engine rotational speed (see rotational speed signal nmot) and on the current engine load (see load signal rl) then stipulates the value of output signal 28. If no knocking of the engine is detected, activation signal kr has the value of logic ZERO and the firing angle setpoint unit does not perform a correction of the firing angle with regard to knock control. However, if knocking of the engine is detected, the activation signal kr has the value of logic ONE. Switching unit 30 operates in switch state 1 and the course of output signal 28 stipulates the course of input signal dwkrz. Firing angle setpoint unit 32 corrects the firing angle so that knocking is counteracted. The engine characteristics map stored in engine characteristics map unit 26 for the double injection is used for correction.

If engine knocking no longer occurs, then activation signal kr again has the value of logic ZERO and switching unit 30 switches back to switch state 0. Fault signal f and control signal hks remain at the value of logic ONE, however.

LIST OF REFERENCE NOTATION

| | |
|---|---|
| 0, 1 | switch state |
| 10 | control circuit |
| 12 | AND logic element |
| kr | activation signal |
| f | fault signal |
| hkss | request signal |
| hks | control signal |
| 20 | AND logic element |
| 22 | NOT element |
| 24 | switching unit |

-continued

| | |
|---|---|
| 26 | engine characteristics map unit |
| nmot | rotational speed signal |
| rl | load signal |
| kfw | engine characteristics map value |
| 28 | output signal |
| sv | output signal |
| 30 | switching unit |
| dwkrz | input signal |
| 32 | firing angle setpoint unit |
| zzyl | cylinder counting signal |
| 34 | firing angle signal |
| 36 | logic signal |
| 38 | switching signal |

What is claimed is:

1. A method of preventing knocking in the event of a failure of a knock control, comprising:
   regulating at least one of a firing angle and an ignition time of an engine having direct injection by using the knock control to prevent knocking during an engine operation;
   in a fault-free operation of the knock control, injecting a fuel into a combustion chamber of a cylinder of the engine at least once per operating cycle;
   monitoring a combustion by the knock control; and
   in the event of a disturbance in the knock control, altering a number of injection operations per operating cycle.

2. The method as recited in claim 1, wherein:
   in the event of the disturbance in the knock control, the fuel is injected at least once more per operating cycle of the cylinder than in the fault-free operation of the knock control.

3. The method as recited in claim 1, wherein:
   in the event of the disturbance in the knock control, at least one of the firing angle and the ignition time is controlled as a function of an operating point of the engine.

4. The method as recited in claim 3, wherein:
   the operating point includes at least one of a rotational speed and a load.

5. A device for preventing knocking in the event of a failure of a knock control, comprising:
   a monitoring circuit for the knock control and for regulating at least one of a firing angle and an ignition time of an engine having direct injection; and
   a control unit that initiates a substitute measure to prevent knocking in the event of a fault in the knock control, depending on an output signal of the monitoring circuit, wherein:
   the substitute measure includes an alteration of a number of fuel injection operations per operating cycle of a cylinder of the engine.

6. The device as recited in claim 5, wherein:
   the number of fuel injection operations per operating cycle is increased as the substitute measure.

7. The device as recited in claim 5, wherein:
   the control unit controls at least one of the firing angle and the ignition time as a function of an operating point of the engine.

8. The device as recited in claim 7, wherein:
   the operating point includes at least one of a rotational speed and a load.

9. The device as recited in claim 7, wherein:
   the control unit includes a first switching unit that switches over as a function of the output signal of the monitoring circuit, and
   the control unit includes a second switching unit connected at an input side to an output of the first switching unit, the second switching unit switching over as a function of a signal that signals the knock control.

10. The device as recited in claim 9, wherein:
    the control unit includes a logic element for generating a switching signal for the first switching unit,
    the output signal of the monitoring circuit and a control signal are applied to inputs of the logic element, signaling a transition to the substitute measure, and
    an output of the logic element is connected to a switching input of the first switching unit.

11. The device as recited in claim 10, wherein:
    the output of the logic element is connected to the switching input of the first switching unit via a NOT element.

12. The device as recited in claim 5, wherein:
    the control unit includes a logic unit,
    the output signal of the monitoring circuit and a signal that signals the knock control are applied to inputs of the logic element, and
    an output of the logic unit is connected to a unit for controlling the fuel injection operations.

* * * * *